May 16, 1967    H. E. BRUNELLE, JR., ET AL    3,320,019
SCANNING PRISM UTILIZING FOUR ROOF PRISM COMPONENTS
Filed Dec. 30, 1963    3 Sheets-Sheet 1

Inventors:
Henry E. Brunelle, Jr.,
Stanley J. Schwartz
by John F. McDevitt
Their Attorney

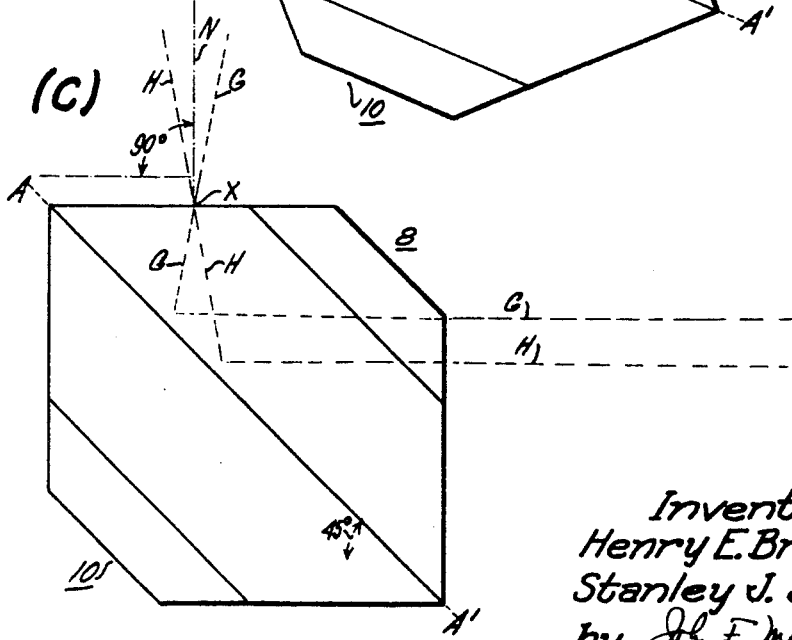

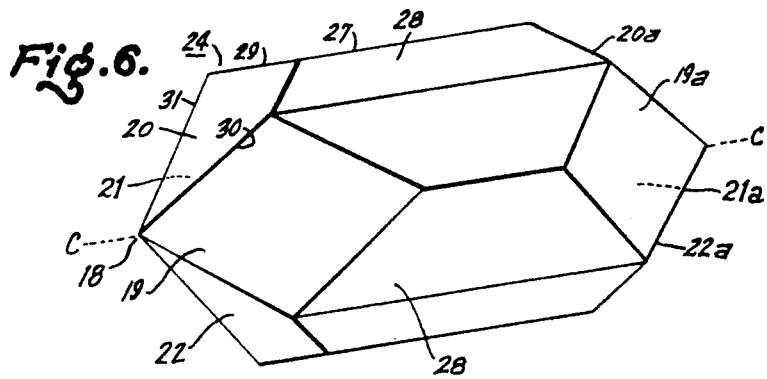
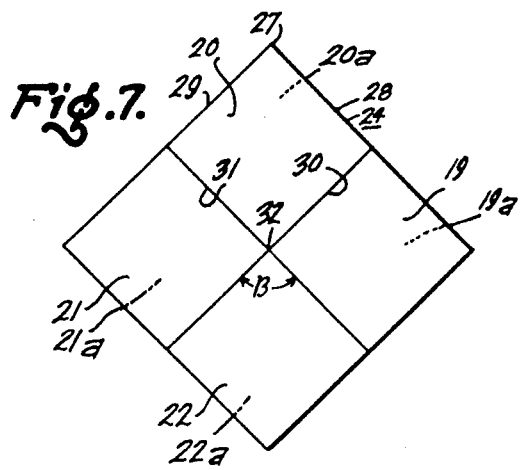
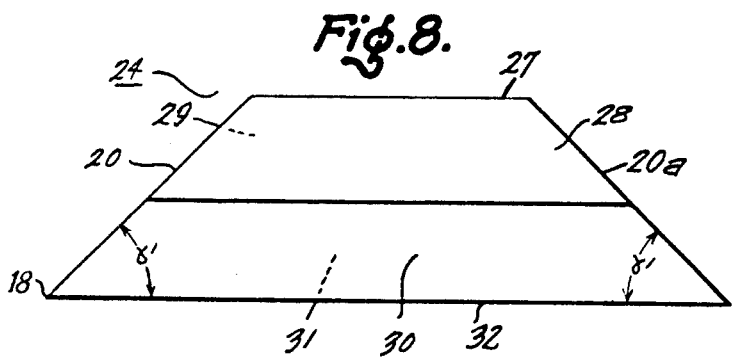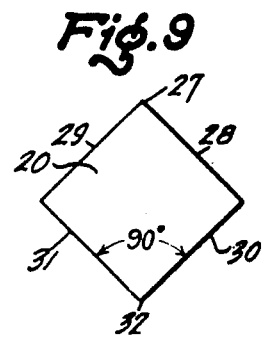
Inventors
Henry E. Brunelle, Jr.,
Stanley J. Schwartz
by John F. McDevitt
Their Attorney

United States Patent Office 3,320,019
Patented May 16, 1967

3,320,019
SCANNING PRISM UTILIZING FOUR ROOF
PRISM COMPONENTS
Henry E. Brunelle, Jr., Scotia, N.Y., and Stanley J.
Schwartz, Clarks Summit, Pa., assignors to General
Electric Company, a corporation of New York
Filed Dec. 30, 1963, Ser. No. 334,154
2 Claims. (Cl. 350—286)

This invention pertains generally to an optical prism construction. More particularly, the present invention pertains to a novel prism configuration providing wider field of view and other advantages. Specifically, this invention relates to a compound optical prism capable of improved viewing along more than a single axis.

Use of an optical prism to transmit a light image is known. Internal reflection of light rays in a prism provides means for varying the line of sight for an optical system without having to move the entire system. One prior art embodiment, located a Dove prism at the entrance pupil of an optical system and pivoted the prism about the line of sight to change the view. The light path through the prism proceeds by refraction from a sloping entrance surface to the reflecting base plane from which it is directed internally to an opposing exit surface. The direction of light travel in the prism is governed by known laws of optical reflection and refraction between the prism surfaces. A scanning prism with a wider field of view along a single axis may be obtained by joining two identical Dove prisms at the reflecting base planes after incorporating an optical barrier layer at the boundary interface. While said barrier layer divides the entry image into two light beams, the light paths through the individual prisms are equal and no double image results at the exit pupil. Location of the reflecting interface at the front focal point of an associated optical system renders it invisible in the transmitted light.

The aforementioned scanning systems vary line of sight in a single plane only. Inability of the described sighting members to transmit a light image faithfully along another axis has thus far severely limited usefulness for the general application. The single viewing face in a Dove prism further limits fixed field of view for the entire optical system thereby also minimizing its value as a scanning member. It would be highly desirable to provide a prism whereby both the fixed field of view for a given size element and the extent of total field which can be viewed is increased.

It is an important object of the invention, therefore, to provide a novel prism configuration with improved performance characteristics.

It is another important object of the invention to provide an optical prism capable of deviating the line of sight for an associated optical system in more than a single plane.

A further important object of the invention is to provide a compound optical prism which transmits a composite single image made up of light rays received from adjoining quadrants facing the prism.

Still another important object of the invention is to provide an optical prism which may be pivoted about its viewing axis in mutually perpendicular directions to transmit a faithful image of the light pattern received.

These and other important objects of the invention will be apparent from the following detailed description taken in connection with the accompanying drawings in which:

FIGURE 5 is a trace diagram of the path taken by light rays through a plane of the prismatic element in FIGURE 3;

FIGURE 6 illustrates a different embodiment of the compound prism of the invention;

FIGURE 7 is an end view of the optical prism shown in FIGURE 6;

FIGURE 8 is a side perspective view of a single prismatic element in the FIGURE 6 embodiment; and FIGURE 9 is an end view of the prismatic element shown in FIGURE 8.

Briefly, the optical prism of the invention comprises a composite array of identical roof-prism elements joined together in abutting relationship at the reflecting surfaces to form a common edge constituting a central axis of the prism, said roof-prism elements each having sloping end faces defined by planes intersecting the central axis at some common acute angle. The term "identical" as used hereinafter in the specification and claims to define component roof-prism elements of the compound prism denotes a transparent glass shape with the same index of refraction, optical dispersion characteristics and geometrical configuration. By same geometrical configuration is meant equal dimensions including angular relationship between intersecting surfaces so as to preclude double image formation at operative viewing distances from unequal light path lengths through individual prism elements. The general configuration of each component prism element is known as a Wirth prism and it comprises a Dove prism having the base plane reflecting surface replaced by two intersecting planes to form a reflecting roof construction.

Figure 1:
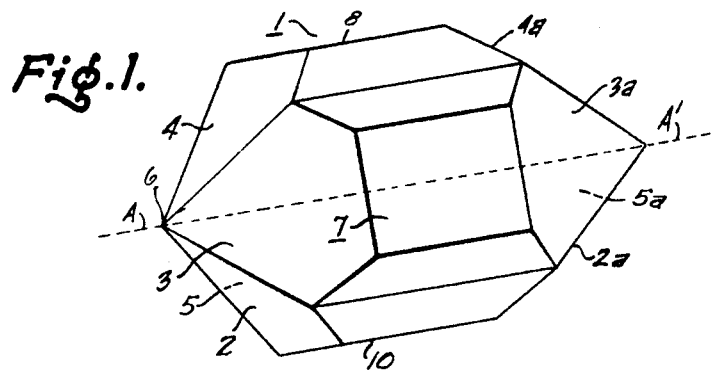
FIGURE 1 is a perspective view illustrating one embodiment of the compound prism of the invention.

As embodied in FIGURE 1 the compound prism has a central body portion 1 terminating at one end with viewing face portions 2–5 and at the opposite end with viewing face portions 2a–5a. Central body portion 1 has a regular octagonal crosssection defined by non-reflecting exterior surfaces of four Wirth prism elements making up the composite member. End faces 2–5 and 2a–5a are symmetrically oriented around axis A–A', which constitutes the central viewing axis for the compound prism, so that planes bisecting the angles of intersection between pairs of opposing faces at one end are mutually perpendicular. The described grouping of end faces receives light from all four spatial quadrants viewed by the individual faces for resolution at the opposite end of the prism into a single composite image. Symmetrical orientation of opposing end face groups around the central axis, which also serves as a common edge of intersection for all internal reflecting surfaces in the compound prism, produces the desired cooperation. The described configuration is obtained by association of four Wirth prism elements around said central axis, each element terminating in pentagonal shaped end faces bearing the same numerical identification, such as 2 and 2a, 3 and 3a, etc. Intersection of end faces in the group 2–5 occurs at point 6 on the central axis while corresponding intersection of the group 2a–5a occurs at point 6a. Symmetrical orientation of terminal viewing components in the compound prism allows interchangeable use of a single viewing end as both an entrance and exit aperture. The result may be achieved readily by pivoting the number about its central viewing axis through various planes intersecting said central viewing axis for advantageous performance to be more fully described hereinafter in the specification. The particular length of a compound prism as measured along the longitudinal viewing axis A–A' is determined by optical requirements for a given application. Thus, it is within contemplation of the invention to employ prisms with a shorter length along their longitudinally extending direction than in any transverse direction.

Figure 2:
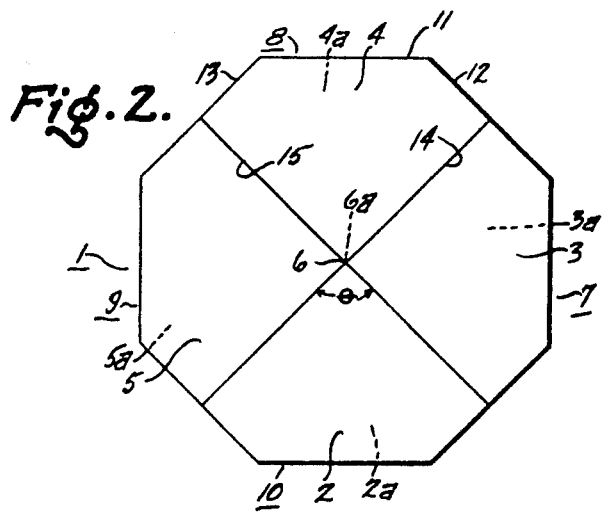
FIGURE 2 is an end view of the member depicted in FIGURE 1.

An end configuration of the embodied compound prism appears in FIGURE 2. Individual Wirth prism elements 7–10 in the end view terminate with pentagonal shaped viewing faces 2–5, respectively. Arrangement of the four prism elements to provide the aforementioned cooperation is accomplished by placing the reflecting surfaces in abutting relationship with intersection at common point 6. Angle $\theta$ formed by intersection of reflecting surfaces in each prism element has a magnitude of 90° to provide the roof prism function. FIGURE 2 also depicts the regular octagonal cross-section of the compound prism as defined by non-reflecing surfaces of assembled Wirth prism elements. From the identical nature of the component prism elements it follows that after assembly as described, there is a point-by-point spatial correspondence between contacting planes of intersection for adjoining elements.

Figure 3:
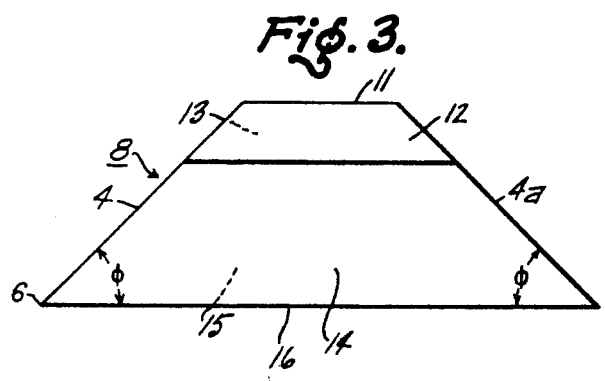
FIGURE 3 is a side perspective view depicting a single prismatic element in the FIGURE 1 embodiment.
Figure 4:
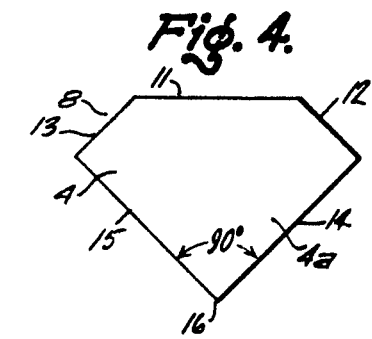
FIGURE 4 is an end view of the prismatic element shown in FIGURE 3.

Having described the general configuration of the entire member, specific details for a suitable Wirth prism element are now presented. A perspective side view of solid prism element 8 along the central viewing axis is depicted in FIGURE 3. The exterior surface of said prism element is defined by intersection of seven planar surfaces consisting of top plane 11, side planes 12 and 13, reflecting roof planes 14 and 15, and end viewing faces 4 and 4a. Intersection between top plane 11 and side planes 12 and 13 form the surface outline of a Dove prism. The roof outlined by surfaces 14 and 15 replaces the conventional single reflecting base plane in a Dove prism. Edge 16 formed by intersection between said roof surfaces occurs on the central viewing axis A–A' of the compound prism. A plane bisecting the roof angle $\theta$ formed between said reflecting surfaces defines a regular trapezoid by intersection with boundary surfaces of the solid element 8. The trapezoid is outlined by edge 16 as the longer horizontal leg, top planar surface 11 forming part of the exterior prism surface as the shorter parallel leg, and end viewing surfaces 4 and 4a connecting the leg portions at an acute angle $\phi$ of interconnection with edge 16. An end view of prism element 8 appears in FIGURE 4. The pentagonal shape of viewing face 4 is formed by sloping intersection of a plane with the longitudinally extending surfaces of the element. Surface intersections are identified by the latter planes, using the same numerals employed in preceding figures to facilitate greater understanding of the embodied configuration. Symmetry of end face construction in the prism elements dictates a corresponding view at the opposing end of the element.

To fabricate the above described member, individual prism elements 7–10 are joined in abutting relationship at the reflecting surfaces around central axis A–A'. An opaque light barrier is preferably interposed between each pair of abutting reflecting surfaces to prevent light passage between prism elements which lowers performance efficiency. An effective light barrier may be achieved simply by coating reflecting surfaces with an opaque layer or reflective film before assembly. Coating a single reflecting surface in each pair of abutting elements may be adequate for the purpose. Alignment of the elements around central axis A–A' must be carefully controlled to prevent double image formation. In proper alignment, end faces at opposite ends of two prism elements lying in a plane bisecting roof angles $\theta$ will be parallel to each other. From symmetrical end construction for each prism element, it follows that remaining oppositely disposed end faces of said two elements are also mutually parallel.

A permanent assembly of the four prism elements is readily obtained by cementing the abutting reflecting surfaces. The final construction provides a symmetrical aperture at each end of the compound prism whereby light images impinging upon the separate viewing faces at one end are resolved into a single composite image at the opposite end. The desired cooperation is achieved for objects viewed at all distances greater than some finite distance fixed by optical characteristics of the individual prism elements.

For better understanding of image transmission through the compound prism, a light trace diagram in a plane bisecting roof angles $\theta$ of elements 8 and 10 appears in FIGURE 5. To simplify the explanation, a path taken by two rays through prism element 8 has been selected for illustration. It follows that a light trace diagram through all elements in the prism is also governed by the same mechanism to be described. Accordingly, transmission of light rays G and H through prism element 8 is traced in FIGURES 5a–5c as a function of pivoting the prism about a point on the central axis through an angle of 45° from an original horizontal disposition. A reference line N perpendicular to incident viewing face 4 has been drawn for ease of referencing change in light direction during passage through the element. In FIGURE 5a the light rays emanate from each side of a line of sight parallel with central viewing axis A–A', etc. Impingement of light rays G and H on face 4 at point X causes refraction of the light toward normal line N. The redirected rays intersect reflecting surfaces 14 and 15 for additional reflection between said surfaces and subsequent travel in a new direction toward emergence face 4a. The emerging rays are subjected to further refraction at the interface of surface 4a causing additional direction change in progress out the exit of the prism. The emergence path is at some acute angle with central prism axis A–A'. Direction change of light rays in passage through the prism follows the laws of optics. Regulation is achieved by selecting physical dimensions for the identical prism elements, angles of intersection between prism element surfaces, index of refraction for the glass composition employed, and to a smaller extent dispersion characteristics within the glass. The composite image emerging from the prism can be focused by lens to the entrance pupil of an associated optical system. Projection of the field viewed with a prism to an associated optical system is readily achieved with prism location at the focal length of the system entrance pupil. Conversely, pivoting the prism about a point on the optical axis of the system provides means for scanning substantially an entire hemispherical field of view facing the prism aperture without further physical movement. Complete rotation of the prism about its pivot point allows interchangeable use of the same viewing end for either an entrance or exit aperture.

In FIGURE 5b the prism has been pivoted upwardly by approximately 22.5° from its original disposition with the line of sight shifting 45° in the same direction. The usual 2:1 optical advantage which occurs when a Wirth prism is pivoted permits scanning an angle of 45° with movement through an angle of 22.5°. Symmetrical construction of the viewing aperture yields like advantage along other axes of traverse. A projection of the exiting light rays G and H at the new position forms a smaller acute angle with a horizontal plane then obtained in FIGURE 5a. In FIGURE 5c the prism has been pivoted another 22.5° for a total 45° displacement from the original horizontal disposition. In accordance with the principle previously outlined, a scanning angle of 90° is traversed with a 45° shift of the prism. At the newest location, exit rays G and H now closely approach the horizontal plane.

A specific compound prism having the embodied construction was fabricated with a commercial crown glass, namely the product marketed by Corning Glass Company under trade designation #573–574. The glass had an index refraction of approximately 1.5725 and was relatively free of bubbles and striae. Common edge 16 for the prism element measured approximately 4.125 inches in length with height from the common edge to top plane 11 measuring approximately 1.5 inches. Top plane 11 had a square shape with an edge length of approximately 1.25 inches. The length of side planes 12 and 13 extending from top plane 11 to reflecting surfaces 14 and 15 measured approximately 0.625 inch. Roof angle θ measured 90° with each of the base angles φ for the symmetrical end face construction being 45°. The instantaneous field of view for the member was about 24°.

From the foregoing description, it follows that a fixed field of view in the prism is a composite of the area fields viewed by quadrant faces at the entrance aperture. When the prism is pivoted about mutually perpendicular axes, such as by gimbal mounting, substantially the entire hemispherical field facing the entrance aperture is transmitted to the exit aperture. By locating optically reflective elements at the exit aperture the scanning field of the prism can be further increased. Thus, a plurality of mirrors, some or all of which may be mounted on a pivotably mounted prism allows scanning a solid angle of 200° or even greater. Fixed or movable mirrors at the exit aperture may also be employed to project the emerging image to a remotely located optical system. With the latter arrangement it is unnecessary to have the prism viewing axis in direct alignment with the optical axis of an associated device, such as a television camera, or the like.

A different embodiment of the compound prism is shown in FIGURE 6. The general structure is the same as that of the previous embodiment except for the end face configuration. More particularly, symmetrical end faces 19–22 and 19a–22a are each square shaped as distinct from the pentagonal shape of previous end faces. Square construction is obtained by extending the side planes 28 and 29 of each element for intersection at corner line 27. This modification converts the entire prism crosssection to a square shape as more clearly shown in FIGURE 7. The corresponding extension of end faces in this manner desirably increases the aperture area for a larger field of view than is obtained with pentagonally shaped surfaces. For proper cooperation between individual prism elements 24–27 roof angles β are still of 90° magnitude. Likewise, the prism elements are aligned around point 18 to define a central prism axis C–C′ at the common edge.

A perspective side view of single Wirth prism element 24 in the FIGURE 6 embodiment appears in FIGURE 8. The solid element is defined by intersection of side planes 28–31 as terminated by sloping end face planes 20 and 20a. The latter surfaces intersect edge 32 on the central axis at acute angle γ. A clearer view of end face 20 appears in FIGURE 9 showing roof angle β made by intersection of reflecting surfaces 30 and 31 at point 18. Cooperation between individual viewing faces at one end of the member provides a composite image in the same manner previously described.

Having described the embodied configuration generally, a specific member fabricated from quartz glass with a refractive index of approximately 1.460 is provided for illustration. Assembly of individual Wirth prism elements to form the composite member may follow the same procedure previously outlined. If the corners of the member are beveled, however, it will minimize glass breakage both during assembly and use. Accordingly, the compound prism is assembled with identical Wirth prism elements having a height of approximately 1.5 inches from common edge 32 to corner line 27. The common edge length of each element is approximately 4.1 inches. Corner line 27 is approximately 1.2 inches long and angles γ formed by intersection of end faces 20 and 20a with the central prism axis measure 45°.

Compound prisms of the invention provide optical scanning along mutually perpendicular axis with no image inversion or rotation. Pivoting the prism about both axes permits scanning a hemispherical area facing the prism without employment of additional optical elements at the exit aperture. With additional optical elements disposed at the exit aperture, such as the aforementioned mirror systems, the sole limitation on complete spherical scanning is a blind spot created by presence of the prism itself. Consequently, in its broadest sense, the present invention comprises an omnidirectional optical scanning means. Instantaneous field of view for the prism is theoretically unlimited from 0° to an obtuse angle approaching 180°. By eliminating the image inversion and rotation encountered in conventional prisms, corrective optical elements previously employed for faithful image transmission have been obviated.

From the foregoing description, it is apparent that a novel compound prism has been provided capable of multi-axis scanning. It is not intended to limit the invention to the preferred embodiments above shown, however, since it will be obvious to those skilled in the art that certain modifications from the present teachings can be made without departing from the true spirits of the invention. The shape of those surfaces defining the longitudinal portion of the prism exterior need not be flat planes and a prism of cylindrical cross-section is contemplated. The desired cooperation between individual prism elements in the composite member is obtained so long as the reflecting surfaces and end faces have the aforementioned spatial association. As previously mentioned, it is contemplated to rotate the symmetrical viewing ends by spinning the prism about its midpoint and using the same viewing end interchangeably as an extreme and exit aperture. By such procedure, a much higher viewing time efficiency can be achieved compared with prisms having unsymmetrical entrance and exit pupils. Likewise, it is contemplated to assemble a plurality of the present compound prisms in abutting side-by-side relationship to form a modularized nesting arrangement with larger aperture as well as viewing field. It is intended to limit the present invention, therefore, only to the scope of the following claims.

What is claimed as new and desired to be secured by Letters Patent of the United States is:

1. A composite optical prism which comprises four identical roof-prism elements joined together in abutting relationship so that the roof edge formed by intersection of the two roof surfaces in each prism element provides a common edge constituting the central viewing axis of the composite prism so formed, each of said roof-prism elements being defined by oppositely sloping planes at opposite ends of the element which intersect the roof surfaces to form a common acute angle in the element between the intersecting plane and the central viewing axis, whereby the intersection of said sloping planes with said central viewing axis at each end of said elements is at a common point, and means to cause light reflection from each of the roof surfaces.

2. A composite optical prism which comprises four identical Wirth prism elements joined together in abutting relationship so that the roof edge formed by intersection of the two roof surfaces in each prism element provides a common edge constituting the central viewing axis of the composite prism so formed, said Wirth prism elements each terminating at opposite ends in a common point on said central viewing axis, and means to cause light reflection from each of the roof surfaces.

References Cited by the Examiner
UNITED STATES PATENTS 2,251,177   7/1941   Thomas _____ 88—1

JEWELL H. PEDERSEN, *Primary Examiner.*

R. J. STERN, *Assistant Examiner.*